United States Patent
Kim et al.

(10) Patent No.: US 11,874,734 B2
(45) Date of Patent: Jan. 16, 2024

(54) MEMORY AND OPERATION METHOD OF THE SAME

(71) Applicant: SK hynix Inc., Gyeonggi-do (KR)

(72) Inventors: Dae Suk Kim, Gyeonggi-do (KR); Eung Bo Shim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/847,837

(22) Filed: Jun. 23, 2022

(65) Prior Publication Data

US 2023/0289259 A1    Sep. 14, 2023

(30) Foreign Application Priority Data

Mar. 8, 2022  (KR) .......................... 10-2022-0029325

(51) Int. Cl.
*G06F 11/10* (2006.01)
(52) U.S. Cl.
CPC ............................... *G06F 11/1016* (2013.01)
(58) Field of Classification Search
CPC .................................................. G06F 11/1016
USPC ......................................................... 714/755
See application file for complete search history.

(56) References Cited

U.S. PATENT DOCUMENTS

| | | | | |
|---|---|---|---|---|
| 7,231,562 B2 * | 6/2007 | Ohlhoff | ................ | G11C 29/40 714/755 |
| 7,739,576 B2 * | 6/2010 | Radke | ................ | B32B 27/08 714/755 |
| 9,524,208 B2 * | 12/2016 | Kim | ................ | H03M 13/1111 |
| 9,864,654 B2 * | 1/2018 | Vishne | ................ | G06F 11/1048 |
| 11,714,709 B2 * | 8/2023 | Cadloni | ................ | G06F 3/0653 714/755 |
| 2012/0144263 A1 * | 6/2012 | Keays | ................ | H03M 13/132 714/763 |
| 2012/0159281 A1 * | 6/2012 | Shalvi | ................ | G06F 11/1044 714/763 |
| 2012/0254680 A1 * | 10/2012 | Oh | ................ | G11C 5/025 714/E11.159 |
| 2013/0254622 A1 * | 9/2013 | Kanno | ................ | G11C 16/10 714/755 |
| 2021/0042185 A1 | 2/2021 | Rooney et al. | | |
| 2022/0068363 A1 * | 3/2022 | Lee | ................ | G11C 11/40626 |

FOREIGN PATENT DOCUMENTS

KR    10-2019-0087180 A    7/2019

* cited by examiner

*Primary Examiner* — Albert Decady
*Assistant Examiner* — Enam Ahmed
(74) *Attorney, Agent, or Firm* — IP & T GROUP LLP

(57) ABSTRACT

A method for operating a memory includes: performing an error check operation on first memory cells; performing an error check operation on second memory cells; detecting an error which is equal to or greater than a threshold value in a region including the first memory cells and the second memory cells; classifying the region as a bad region in response to the detection of an error which is equal to or greater than the threshold value; and performing an error check operation on the first memory cells and the second memory cells again in response to the classification of the bad region.

10 Claims, 3 Drawing Sheets

MEMORY AND OPERATION METHOD OF THE SAME

CROSS-REFERENCE TO RELATED APPLICATIONS

The present application claims priority to Korean Patent Application No. 10-2022-0029325, filed on Mar. 8, 2022, which is incorporated herein by reference in its entirety.

BACKGROUND

1. Field

Various embodiments of the present invention relate to a memory.

2. Description of the Related Art

In the early stage of the semiconductor memory device industry, there were many originally good dies on the wafers, which means that memory chips were produced with no defective memory cells through a semiconductor fabrication process. However, as the capacity of memory devices increases, it becomes difficult to fabricate a memory device that does not have any defective memory cells, and nowadays, it may be said that there is substantially no chance that a memory device is fabricated without any defective memory cells. To address the issue, a repair method of including redundant memory cells in a memory device and replacing defective memory cells with the redundant memory cells is being used.

As another method, an error correction circuit (ECC circuit) for correcting errors in a memory system is used to correct errors occurring in memory cells and errors occurring when data are transferred during a read operation and a write operation of the memory system.

SUMMARY

Embodiments of the present invention are directed to a technique for checking errors in a memory.

In accordance with an embodiment of the present invention, a method for operating a memory includes: performing an error check operation on first memory cells; performing an error check operation on second memory cells; detecting an error which is equal to or greater than a threshold value in a region including the first memory cells and the second memory cells; classifying the region as a bad region in response to the detection of an error which is equal to or greater than the threshold value; and performing an error check operation on the first memory cells and the second memory cells again in response to the classification of the bad region.

In accordance with another embodiment of the present invention, a method for operating a memory includes: generating a first address; performing an error check operation on memory cells corresponding to the first address in a memory core; generating a second address which is increased by one step from the first address; performing an error check operation on memory cells corresponding to the second address in the memory core; detecting an error which is equal to or greater than a threshold value in a region including the memory cells corresponding to the second address; classifying the region as a bad region in response to the detection of an error which is equal to or greater than the threshold value; generating a third address which is decreased by N steps, where N is an integer equal to or greater than 1, from the second address in response to the classification of the bad region; and performing an error check operation on memory cells corresponding to the third address in the memory core.

In accordance with yet another embodiment of the present invention, a memory includes: a memory core; an error correction circuit suitable for correcting an error of data that are read from the memory core based on an error correction code that is read from the memory core; an error check operation control circuit suitable for checking an error in data that are stored in the memory core by using the error correction circuit during an error check operation; a bad region classification circuit suitable for classifying a bad region based on errors detected during the error check operation; and an error check address generation circuit suitable for generating an error check address to be used for the error check operation and increasing the error check address by 1 step for each error check operation, and decreasing, when the bad region is newly detected, the error check address by N steps, where N is an integer equal to or greater than 1.

In accordance with still another embodiment of the present invention, a memory includes: a memory core; an error correction circuit suitable for correcting an error of data that are read from the memory core based on an error correction code that is read from the memory core; an error check operation control circuit suitable for checking an error in data stored in the memory core by using the error correction circuit during an error check operation; a bad region classification circuit suitable for classifying a bad region based on errors detected during the error check operation; and an address generation circuit suitable for generating an error check address to be used in the error check operation, changing the error check address whenever the error check operation is performed, and generating again previous N error check addresses during error check operations performed N times after the bad region is newly detected, where N is an integer equal to or greater than 1.

In accordance with still another embodiment of the present invention, a memory includes: memory cells arranged in rows; and a control circuit configured to: perform first error check operations respectively on a sequence of the memory cells to detect, among the rows, a bad row including a predetermined number of errored memory cells or more, and perform second error check operations respectively on memory cells included in a sequence of first and second groups, wherein the first group includes one or more memory cells, on which the first error check operations are completed prior to the errored memory cells, and wherein the second group includes the errored memory cells.

DETAILED DESCRIPTION

Figure 1:
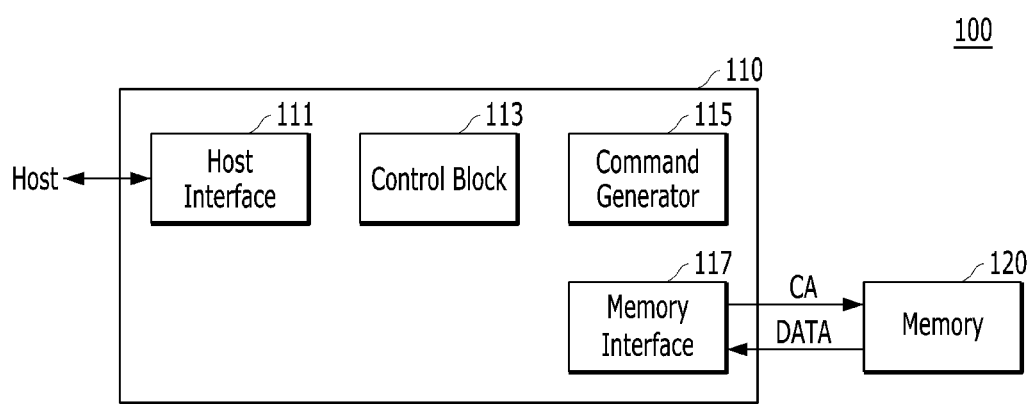
FIG. 1 is a block diagram illustrating a memory system in accordance with an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present invention.

FIG. 1 is a block diagram illustrating a memory system 100 in accordance with an embodiment of the present invention.

The memory controller 110 may control the operation of the memory 120 according to a request of a host HOST. The host HOST may include a Central Processing Unit (CPU), a Graphic Processing Unit (GPU), an Application Processor (AP), and the like. The memory controller 110 may include a host interface 111, a control block 113, a command generator 115, and a memory interface 117. The memory controller 110 may be included in a CPU, GPU, AP, etc. In this case, the host HOST may mean the components other than the memory controller 110 in these structures. For example, when the memory controller 110 is included in a CPU, the host HOST shown in the figure may represent the other components except for the memory controller 110 in the CPU.

The host interface 111 may be an interface for communication between the host HOST and the memory controller 110.

The control block 113 may control overall operations of the memory controller 110 and schedule the operations to be directed to the memory 120. The control block 113 may change the order of the requests received from the host HOST and the order of operations to be directed to the memory 120 in order to improve the performance of the memory 120. For example, although the host HOST requests the memory 120 to perform a read operation first and then to perform a write operation later, the control block 113 may control the order in such a manner that the write operation is performed before the read operation.

The command generator 115 may generate a command to be applied to the memory 120 according to the order of the operations which is determined by the control block 113.

The memory interface 117 may be provided for an interface between the memory controller 110 and the memory 120. Through the memory interface 117, a command and an address CA may be transferred from the memory controller 110 to the memory 120 and data DATA may be transferred/received. The memory interface 117 may also be referred to as a PHY interface.

The memory controller 110 may control the memory 120 in an error check operation mode. When the control block 113 determines to operate the memory 120 in the error check operation mode, the command generator 115 may generate a command for controlling the memory 120 in the error check operation mode, and the memory interface 117 may transfer the command generated by the command generator to the memory. Moreover, the memory controller 110 may request the memory 120 for information about bad regions collected during the error check operation of the memory 120 and receive the information about the bad regions from the memory 120.

The memory 120 may perform an operation directed by the memory controller 110. The memory 120 will be described in detail below with reference to FIG. 2.

Figure 2:
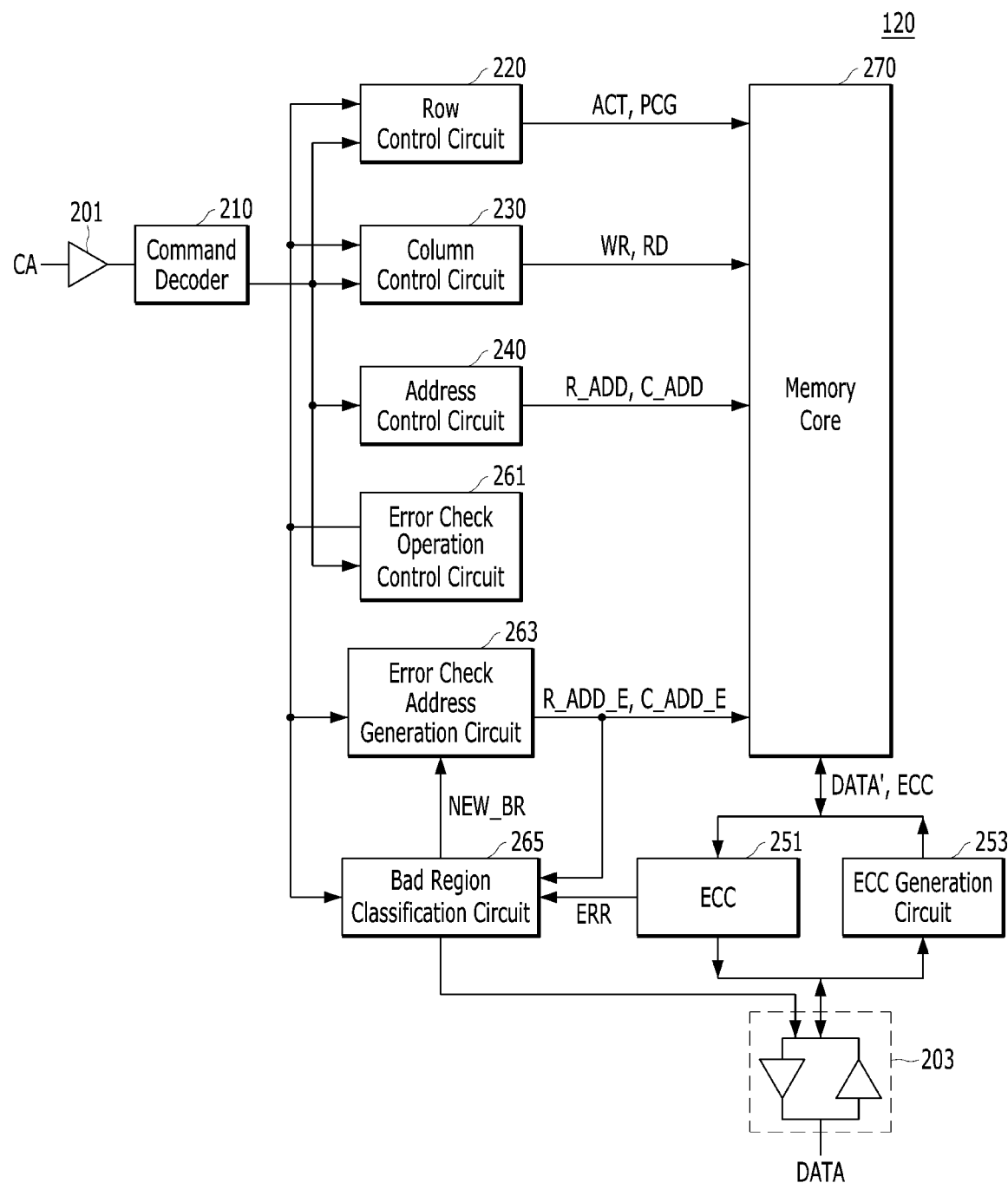
FIG. 2 is a block diagram illustrating a memory shown in FIG. 1 in accordance with the embodiment of the present invention.

FIG. 2 is a block diagram illustrating the memory 120 shown in FIG. 1 in accordance with the embodiment of the present invention.

Referring to FIG. 2, the memory 120 may include a command address receiving circuit 201, a data transferring/receiving circuit 203, a command decoder 210, a row control circuit 220, a column control circuit 230, an address control circuit 240, an error correction circuit 251, an error correction code generation circuit 253, an error check operation control circuit 261, an error check address generation circuit 263, a bad region classification circuit 265, and a memory core 270.

The command address receiving circuit 201 may receive a command and an address CA. Depending on the type of memory 120, a command and an address may be input to the same input terminals, or the command and the address may be input to separate input terminals. Herein, the command and the address are input to the same input terminals. The command and the address CA may be multiple bits.

The data transferring/receiving circuit 203 may receive data DATA or transfer data DATA. The data transferring/receiving circuit 203 may receive data DATA to be written into the memory core 270 during a write operation, and transfer data DATA read from the memory core 270 during a read operation.

The command decoder 210 may decode the command and the address CA to find out the type of operation directed by the memory controller 110 to the memory 120.

When it turns out as a result of the decoding of the command decoder 210 that a row-based operation, such as an active operation or a precharge operation, is directed, the row control circuit 220 may control these operations. An active signal ACT may be a signal for directing an active operation, and a precharge signal PCG may be a signal for directing a precharge operation.

When it turns out as a result of the decoding of the command decoder 210 that a column-based operation, such as a write operation or a read operation, is directed, the column control circuit 230 may control these operations. A write signal WR may be a signal for directing a write operation, and a read signal RD may be a signal for directing a read operation.

Furthermore, when it turns out as a result of the decoding of the command decoder 210 that the error check operation mode is directed, the memory 120 may operate in the error check operation mode. In the error check operation mode, the memory 120 may operate under the control of the error check operation control circuit 261.

The address control circuit 240 may classify an address which is received from the command decoder 210 as a row address R_ADD or a column address C_ADD and transfer it to the memory core 270. When it turns out as a result of the decoding of the command decoder 210 that an active operation is directed, the address control circuit 240 may classify the received address as a row address R_ADD, and when a read or write operation is directed, the address control circuit 240 may classify the received address as a column address C_ADD.

The error correction circuit 251 may correct an error in data DATA' that are read from the memory core 270 based on the error correction code ECC that is read from the memory core 270 during a read operation. Herein, correcting an error may mean detecting an error in the data DATA' and correcting the detected error in the data DATA'. The error correction circuit 251 may also detect and correct an error in the error correction code ECC as well along with the data DATA'. When an error in the data DATA' is detected and corrected, the data DATA' that are input to the error correction circuit 251 and the data DATA that are output from the error correction circuit 261 may be different from each other. An error signal ERR may be a signal activated when an error is detected by the error correction circuit 251.

The error correction code generation circuit 253 may generate an error correction code ECC based on data DATA during a write operation. During a write operation, only the error correction code ECC may be generated based on the data DATA, but the error of the data DATA may not be corrected. Therefore, the data DATA that are input to the error correction code generation circuit 253 and the data DATA' that are output from the error correction code generation circuit 253 may be the same.

The error check operation control circuit 261 may control an error check operation. The error check operation may also be referred to as an ECS (Error Check and Scrub) operation. The error check operation may mean an operation of reading data DATA' from the memory core 270 and checking the errors of the data DATA' by using the error correction circuit 251 in order to detect regions with many errors. The error check operation control circuit 261 may control the error check operation when the error check operation mode is set. Since an error check operation requires controlling rows and columns of the memory core 270, the error check operation control circuit 261 may control the row control circuit 220 and the column control circuit 230 during the error check operation. Also, it may control the error check address generation circuit 263 and the bad region classification circuit 265 that are related to the error check operation.

The error check address generation circuit 263 may generate error check addresses R_ADD_E and C_ADD_E to be used for an error check operation. The error check addresses R_ADD_E and C_ADD_E may include an error check row address R_ADD_E and an error check column address C_ADD_E. The error check address generation circuit 263 may change the error check addresses R_ADD_E and C_ADD_E for each error check operation. The error check address generation circuit 263 may increase the error check addresses R_ADD_E and C_ADD_E by one step whenever an error check operation is performed. When the value of the error check row address R_ADD_E ranges from 0 to X and the value of the error check column address C_ADD_E ranges from 0 to Y, the error check address generation circuit 263 may generate the error check addresses R_ADD_E and C_ADD_E as (0,0) during the first error check operation. In the second error check operation, the error check address generation circuit 263 may generate the error check addresses R_ADD_E and C_ADD_E as (0,1) by increasing the error check addresses R_ADD_E and C_ADD_E by one step. Similarly, in the third error check operation, the error check address generation circuit 263 may generate the error check addresses R_ADD_E and C_ADD_E as (0,2) by increasing the error check addresses R_ADD_E and C_ADD_E by one step again. The error check address R_ADD_E and C_ADD_E may be increased by one step whenever an error check operation is performed and may be generated to have different values whenever the error check operation is performed: (0, 0)→(0, 1)→ (0, 2)→ . . . →(0, Y−1)→(0, Y)→(1, 0)→(1, 1)→ . . . → (1, Y−1)→(1, Y)→(2, 0)→(2, 1)→ . . . →(X, Y−1)→(X, Y). Since the error check address generation circuit 263 changes the error check addresses R_ADD_E and C_ADD_E whenever an error check operation is performed, when the error check operation is repeatedly performed, the error check operation may be performed on all memory cells of the memory core 270.

The bad region classification circuit 265 may classify and store bad regions based on the presence of errors that are detected during an error check operation. For example, the bad region classification circuit 265 may count the number of errors of each row and, when the number of the errors of each row exceeds a threshold value, the bad region classification circuit 265 may classify the row as a bad region. Since the bad region classification circuit 265 receives the error check addresses R_ADD_E and C_ADD_E and the error signal ERR, it may be able to check where the error check operation is performed in the memory core 270 and whether an error is detected or not. When a new bad region is detected, the bad region classification circuit 265 may notify the error check address generation circuit 263 of the newly detected bad region. A signal NEW_BR may be a signal for informing the detection of a new bad region.

When a new bad region is detected during the execution of an error check operation, that is, when the signal NEW_BR is activated, the error check address generation circuit 263 may decrease the error check addresses R_ADD_E and C_ADD_E by N steps, where N is an integer equal to or greater than 1. When a bad region is detected, the error check address generation circuit 263 may decrease the error check addresses R_ADD_E and C_ADD_E by N steps in order to check the errors of the peripheral region once again. When the error check addresses R_ADD_E and C_ADD_E are decreased by N steps, the error check operations for the previous N error check addresses R_ADD_E and C_ADD_E may be performed again during the N error check operations after the bad region is detected.

The memory core 270 may perform an operation directed by the internal command signals ACT, PCG, WR, and RD. The memory core 270 may include a cell array including memory cells that are arranged in a plurality of rows and a plurality of columns, a row decoder for activating/deactivating the rows of the cell array, a column decoder for inputting/outputting data from the cell array, and constituent elements for performing active, pre-charge, read, write operations, such as an input/output circuit. When an active signal ACT is activated, a row selected based on the row address R_ADD among the rows of the memory core 270 may be activated. When a precharge signal PCG is activated, the activated row may be deactivated. When a write signal WR is activated, the data DATA' and the error correction code ECC may be written to the columns selected based on the column address C_ADD among the columns of the memory core 270. When a read signal RD is activated, the data DATA' and the error correction code ECC may be read from the columns selected based on the column address C_ADD among the columns of the memory core 270. During an error check operation, the error check addresses R_ADD_E and C_ADD_E generated by the error check address generation circuit 263 may be used instead of the addresses R_ADD and C_ADD of the address control circuit 240.

During an active operation of the memory 120, a row selected based on the row address R_ADD in the memory core 270 may be activated. That is, the data of the selected row may be sensed. A read operation and a write operation of the memory 120 may be performed in an active state. A precharge operation may refer to an operation of terminating an active operation.

During a read operation of the memory 120, data DATA' and the error correction code ECC may be read from the memory cells of the columns selected based on the column address C_ADD in a selected row of the memory core 270. The error correction circuit 251 may correct an error of the data DATA' based on the error correction code ECC, and the error-corrected data DATA may be transferred to the memory controller 110 through the data transferring/receiving circuit 203.

During a write operation of the memory 120, the data transferring/receiving circuit 203 may receive the data DATA transferred from the memory controller 110. The error correction code generation circuit 253 may generate the error correction code ECC based on the data DATA, and the data DATA and the error correction code ECC may be written into the memory cells of the columns that are selected based on the column address C_ADD in the selected row of the memory core 270.

Figure 3:
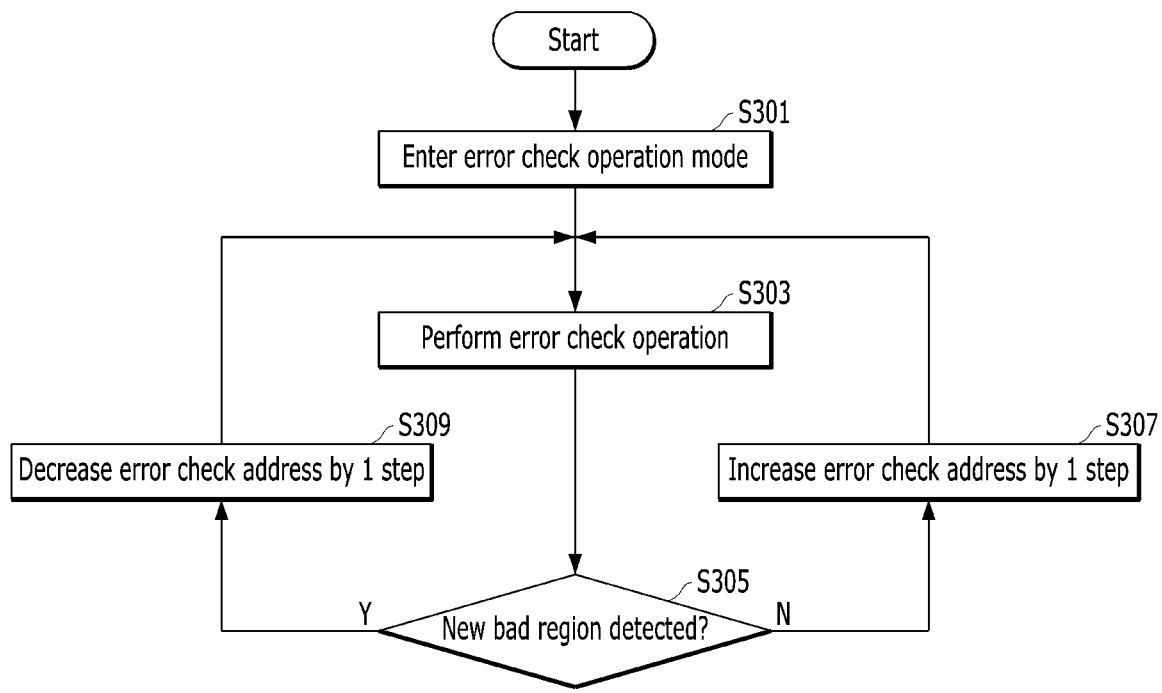
FIG. 3 is a flowchart describing an error checking operation of the memory system shown in FIG. 1 in accordance with an embodiment of the present invention.

FIG. 3 is a flowchart describing an error checking operation of the memory system 100 shown in FIG. 1 in accordance with an embodiment of the present invention.

Referring to FIG. 3, first, the memory 120 may enter an error check operation mode in operation S301. When the memory controller 110 commands the memory 120 to enter the error check operation mode by using a command and an address CA, the memory 120 may enter the error check operation mode.

The memory 120 may now perform an error check operation in operation S303. The error check operation may be performed by reading data DATA' and an error correction code ECC from the memory core 270 based on the error check addresses R_ADD_E and C_ADD_E that are generated by the error check address generation circuit 263, and checking whether the data DATA' have an error or not by using the error correction circuit 251. To be specific, among the rows of the memory core 270, a row corresponding to the error check row address R_ADD_E may be activated, and the data DATA' and the error correction code ECC may be read from the memory cells of the columns corresponding to the error check column address C_ADD_E in the activated row and transferred to the error correction circuit 251. Also, the error correction circuit 251 may check whether the data DATA' have an error or not based on the error correction code ECC.

The bad region classification circuit 265 may classify a region as a bad region based on the presence of an error which is detected during an error check operation. For example, the bad region classification circuit 265 may count the number of errors for each row, and when the number of the errors for a row is equal to or greater than a threshold value, the bad region classification circuit 265 may classify and store the row as a bad region.

When no new bad region is detected by the bad region classification circuit 265 (N in operation S305), the error check address generation circuit 263 may increase the error check addresses R_ADD_E and C_ADD_E by one step in operation S307. Then, an error check operation corresponding to the error check addresses R_ADD_E and C_ADD_E whose value is increased by one step may be performed in operation S303.

When a new bad region is detected by the bad region classification circuit 265 (Y in operation S305), the error check address generation circuit 263 may decrease the error check addresses R_ADD_E and C_ADD_E by N steps in operation S309. Then, an error check operation corresponding to the error check addresses R_ADD_E and C_ADD_E whose value is decreased by N steps may be performed in operation S303. When the error check address is decreased by N steps, error check operations that have been recently performed N times may be performed again. That is, error checking operations for a newly detected bad region and the peripheral region thereof may be performed again to perform error checking more thoroughly.

When a previously detected bad region is detected again as a result of the error check operations that are performed again N times, since it is not a new bad region, the error check addresses R_ADD_E and C_ADD_E may be increased by 1 step. The value of N may be set by the memory controller 110. For example, the value of N may be set by a Mode Register Setting (MRS) operation which is performed by the direction of the memory controller 110.

When there is a request from the memory controller 110, the bad region information collected by the bad region classification circuit 265 may be transferred to the memory controller 110 through the data transferring/receiving circuit 203. The memory controller 110 may control the memory 120 based on the received bad region information. For example, the memory controller 110 may not write data to the bad region of the memory 120.

The memory 120 may be designed to write error-corrected data that are produced by the error correction circuit 251 during an error check operation back into the memory core 270. In this case, an error correction code may be generated again based on the error-corrected data, and the newly generated error correction code may be written into the memory core 270 together with the error-corrected data.

According to an embodiment of the present invention, errors of a memory may be checked.

While the present invention has been described with respect to specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. A method for operating a memory, comprising:
   generating a first address;
   performing an error check operation on memory cells corresponding to the first address in a memory core;
   generating a second address which is increased by one step from the first address;
   performing an error check operation on memory cells corresponding to the second address in the memory core;
   detecting an error which is equal to or greater than a threshold value in a region including the memory cells corresponding to the second address;
   classifying the region as a bad region in response to the detection of an error which is equal to or greater than the threshold value;
   generating a third address which is decreased by N steps, where N is an integer equal to or greater than 1, from the second address in response to the classification of the bad region; and
   performing an error check operation on memory cells corresponding to the third address in the memory core.

2. The method of claim 1, further comprising performing error check operations on memory cells corresponding to the second address and addresses that are decreased by N−1 steps to one step from the second address in response to the classification of the bad area.

3. The method of claim 1, wherein each of the first address, the second address, and the third address includes a row address and a column address.

4. A memory, comprising:
   a memory core;
   an error correction circuit suitable for correcting an error of data that are read from the memory core based on an error correction code that is read from the memory core;

an error check operation control circuit suitable for checking an error in data that are stored in the memory core by using the error correction circuit during an error check operation;

a bad region classification circuit suitable for classifying a bad region based on errors detected during the error check operation; and an error check address generation circuit suitable for generating an error check address to be used for the error check operation and increasing the error check address by 1 step for each error check operation, and decreasing, when the bad region is newly detected, the error check address by N steps, where N is an integer equal to or greater than 1.

5. The memory of claim 4, wherein N is a value which is set according to a direction of a memory controller.

6. The memory of claim 4, wherein the error check address includes a row address and a column address.

7. The memory of claim 4, wherein the bad region classification circuit is further suitable for transferring information of the bad region to the memory controller.

8. A memory, comprising:
a memory core;
an error correction circuit suitable for correcting an error of data that are read from the memory core based on an error correction code that is read from the memory core;
an error check operation control circuit suitable for checking an error in data stored in the memory core by using the error correction circuit during an error check operation;
a bad region classification circuit suitable for classifying a bad region based on errors detected during the error check operation; and
an address generation circuit suitable for
generating an error check address to be used in the error check operation,
changing the error check address whenever the error check operation is performed, and
generating again previous N error check addresses during error check operations performed N times after the bad region is newly detected, where N is an integer equal to or greater than 1.

9. The memory of claim 8, wherein the error check address includes a row address and a column address.

10. The memory of claim 8, wherein the bad region classification circuit is further suitable for transferring information of the bad region to a memory controller.

* * * * *